(12) United States Patent
Darmawan et al.

(10) Patent No.: US 8,837,289 B2
(45) Date of Patent: *Sep. 16, 2014

(54) TERMINATED TRANSMISSION CONTROL PROTOCOL TUNNEL

(75) Inventors: Agustinus Darmawan, King of Prussia, PA (US); Carl J. Peters, Pleasanton, CA (US); James H. Galasso, Jr., Devon, PA (US)

(73) Assignee: Lockheed Martin Corporation, Bethesda, MD (US)

( * ) Notice: Subject to any disclaimer, the term of this patent is extended or adjusted under 35 U.S.C. 154(b) by 127 days.

This patent is subject to a terminal disclaimer.

(21) Appl. No.: 13/592,296

(22) Filed: Aug. 22, 2012

(65) Prior Publication Data

US 2014/0056140 A1     Feb. 27, 2014

(51) Int. Cl.
*H04L 12/24*     (2006.01)

(52) U.S. Cl.
USPC ........... 370/235; 370/312; 370/390; 709/223; 709/236

(58) Field of Classification Search
USPC ......... 370/252, 235, 312, 389, 392, 412, 471, 370/474, 465–467; 709/223–225, 236–238, 709/250, 245; 713/153, 160

See application file for complete search history.

(56) References Cited

U.S. PATENT DOCUMENTS

| | | | | |
|---|---|---|---|---|
| 6,618,397 | B1 * | 9/2003 | Huang | 370/474 |
| 8,248,936 | B2 * | 8/2012 | Kantawala et al. | 370/232 |
| 8,619,776 | B2 * | 12/2013 | Peters et al. | 370/390 |
| 2002/0147826 | A1 * | 10/2002 | Sultan | 709/230 |
| 2003/0055980 | A1 * | 3/2003 | Liu et al. | 709/227 |
| 2006/0101090 | A1 * | 5/2006 | Aloni et al. | 707/201 |
| 2012/0005369 | A1 * | 1/2012 | Capone et al. | 709/236 |

\* cited by examiner

*Primary Examiner* — Charles C Jiang
*Assistant Examiner* — Mohamed Kamara
(74) *Attorney, Agent, or Firm* — Ronald E. Prass, Jr.; Prass LLP

(57) ABSTRACT

A method, a multiprotocol offload engine, and a set of instructions are disclosed. A local area network interface 150 may receive a transmission control protocol data transmission from a source local area network device. A processor 110 may encapsulate the transmission control protocol data transmission in a negative acknowledgement oriented reliable multicast data transmission. A wide area network interface 160 may transmit the negative acknowledgement oriented reliable multicast data transmission over the wide area network 260.

14 Claims, 7 Drawing Sheets

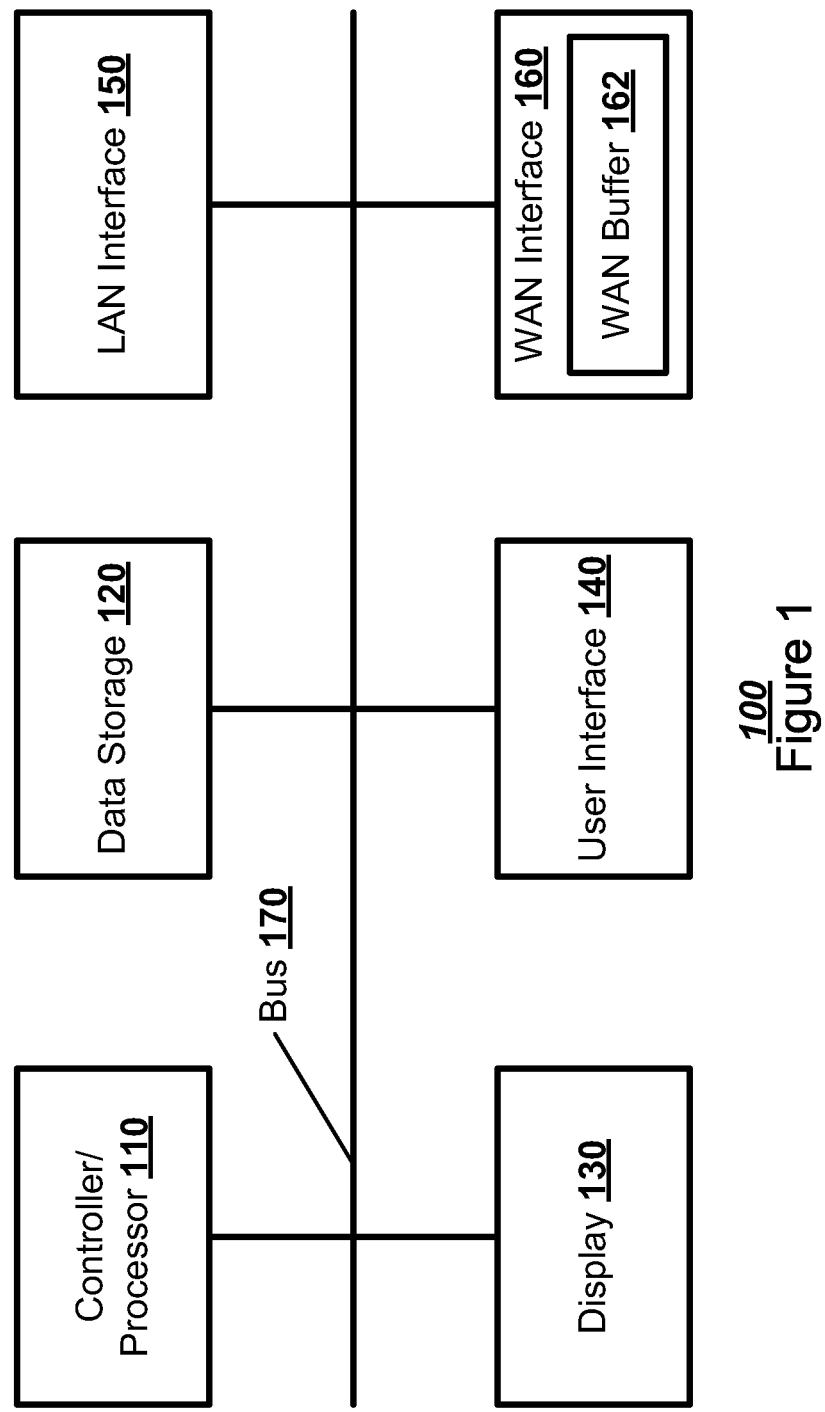

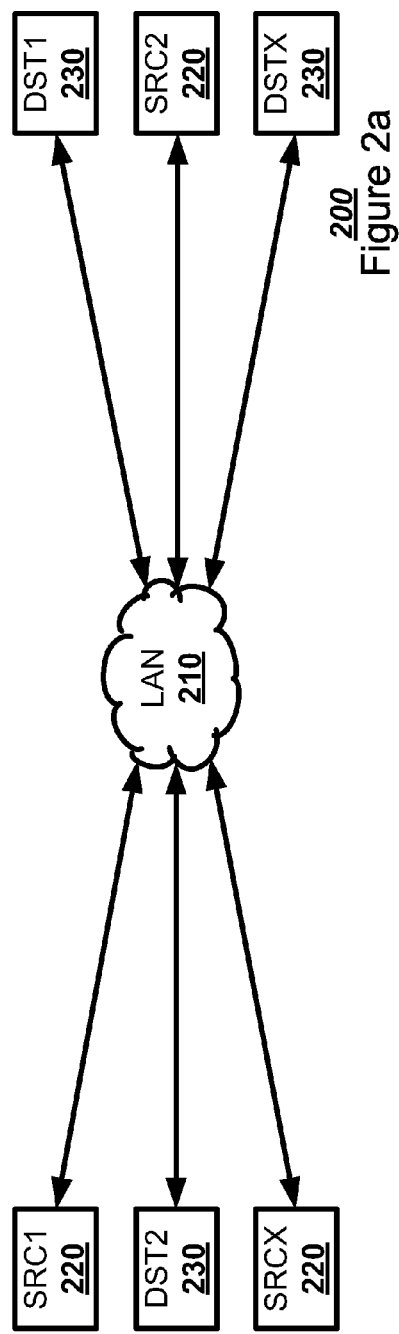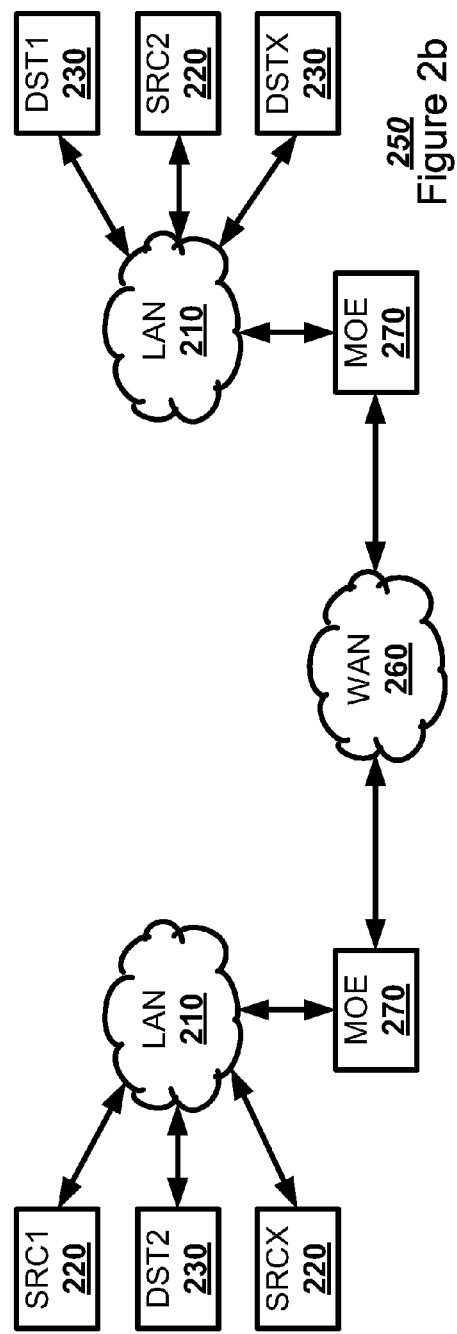

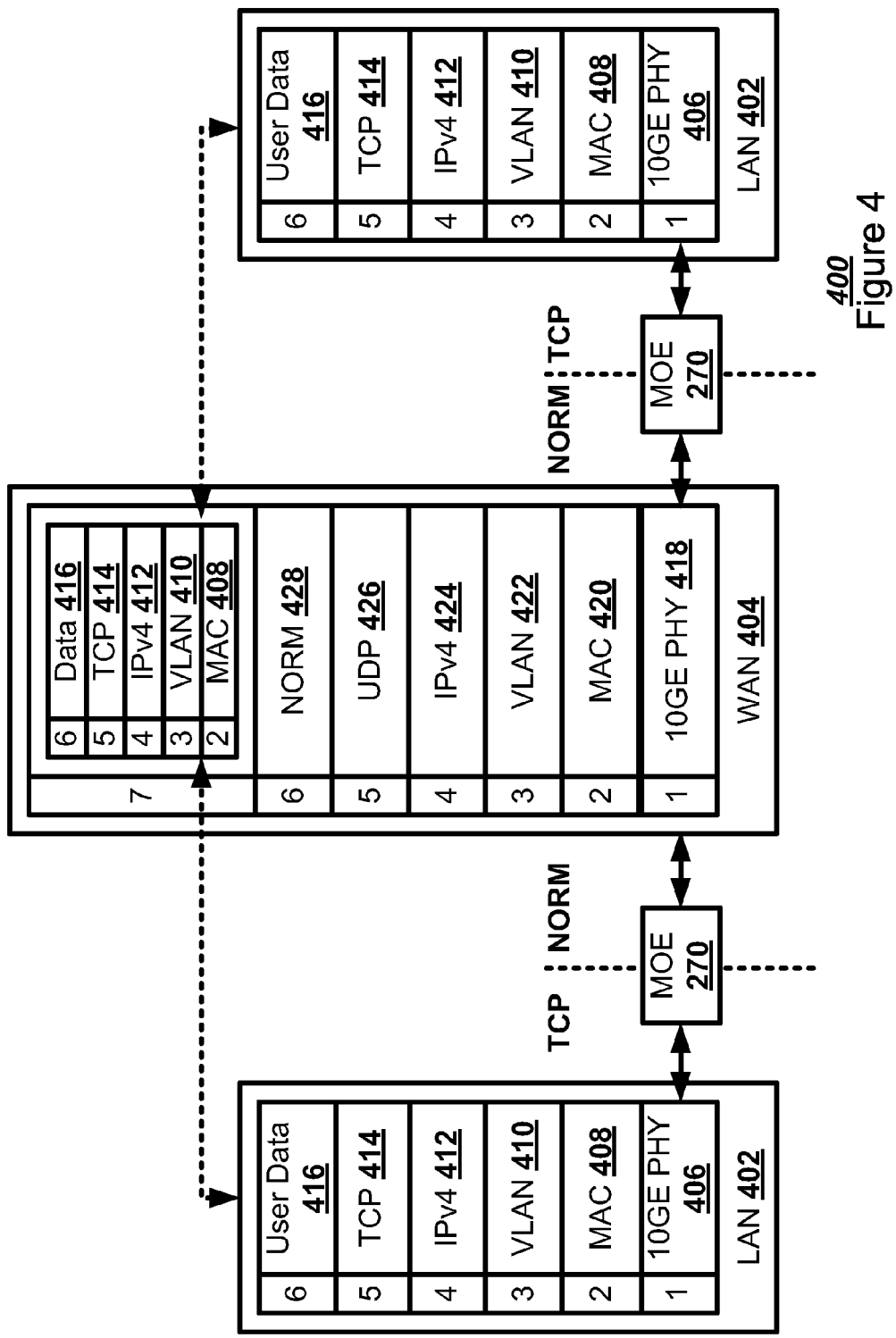

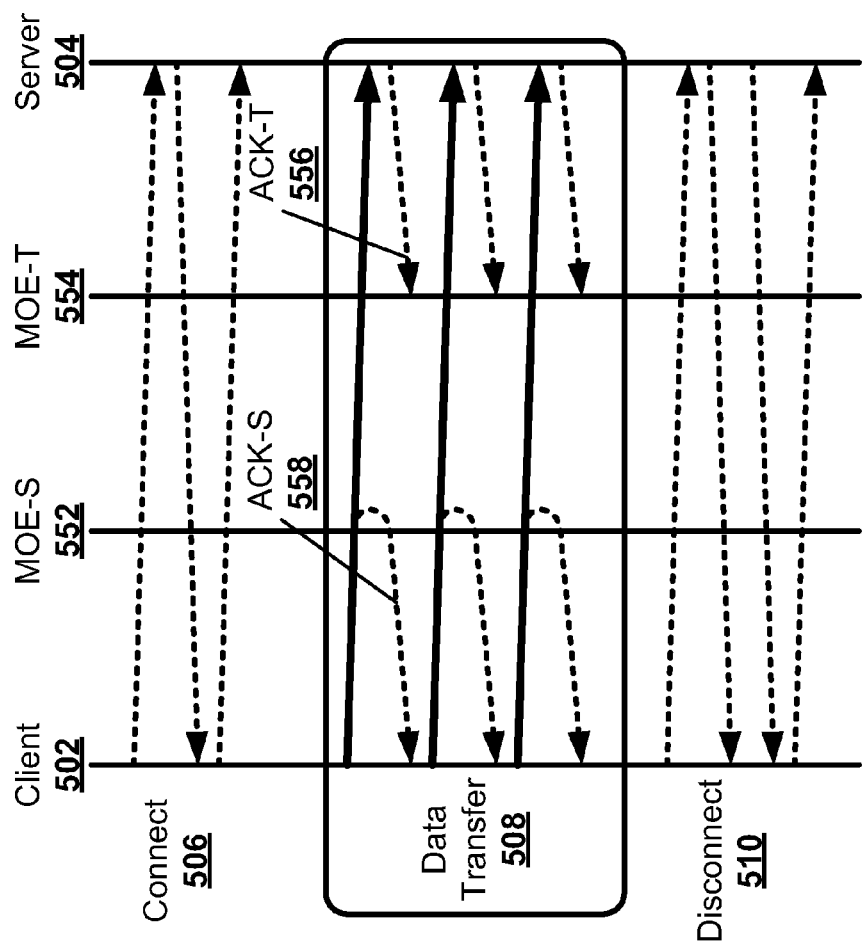
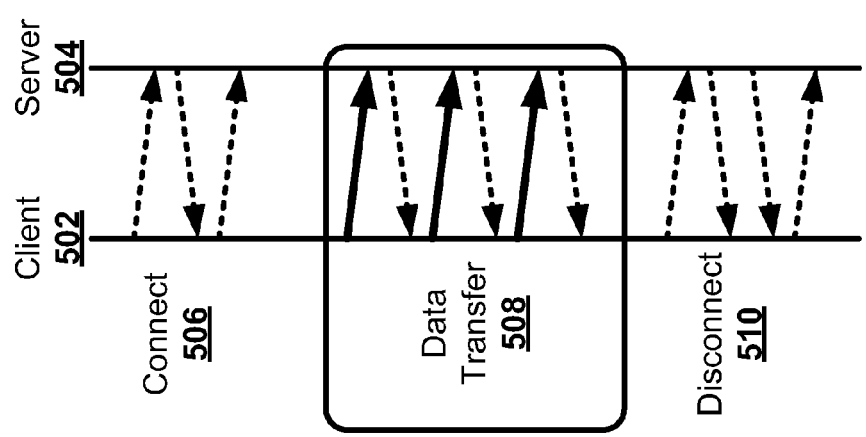

TERMINATED TRANSMISSION CONTROL PROTOCOL TUNNEL

BACKGROUND

1. Field of the Invention

The present invention relates to a method and system for transmitting data across a wide area network. The present invention further relates to using a terminated transmission control protocol tunnel to ease transmission of data across a wide area network.

2. Introduction

A wide area network is a communication network that covers a large geographic area, such as the internet. A communication protocol is a set of rules for transmitting data across the wide area network. Examples of a communication protocol include internet protocol, transmission control protocol, file transfer protocol, and other protocols. Internet protocol governs the transmission of data over the internet. Transmission control protocol may provide a point to point channel across the wide area network. File transfer protocol is a standard network protocol used to transfer files over a transmission control protocol network.

SUMMARY OF THE INVENTION

A method, a multiprotocol offload engine, and a set of instructions are disclosed. A local area network interface may receive a transmission control protocol data transmission from a source local area network device. A processor may encapsulate the transmission control protocol data transmission in a negative acknowledgement oriented reliable multicast data transmission. A wide area network interface may transmit the negative acknowledgement oriented reliable multicast data transmission over the wide area network.

BRIEF DESCRIPTION OF THE DRAWINGS

Understanding that these drawings depict only typical embodiments of the invention and are not therefore to be considered to be limiting of its scope, the invention will be described and explained with additional specificity and detail through the use of the accompanying drawings in which:

FIG. 1 illustrates, in a block diagram, one embodiment of a computing device.

FIGS. 2a-b illustrate, in a block diagram, two embodiments of network using a data protocol.

FIG. 4 illustrates, in a block diagram, one embodiment of a terminated transmission control protocol tunnel.

FIGS. 5a-b illustrate, in flow diagrams, two embodiments of a data transmission session.

DETAILED DESCRIPTION OF THE INVENTION

Figure 3:
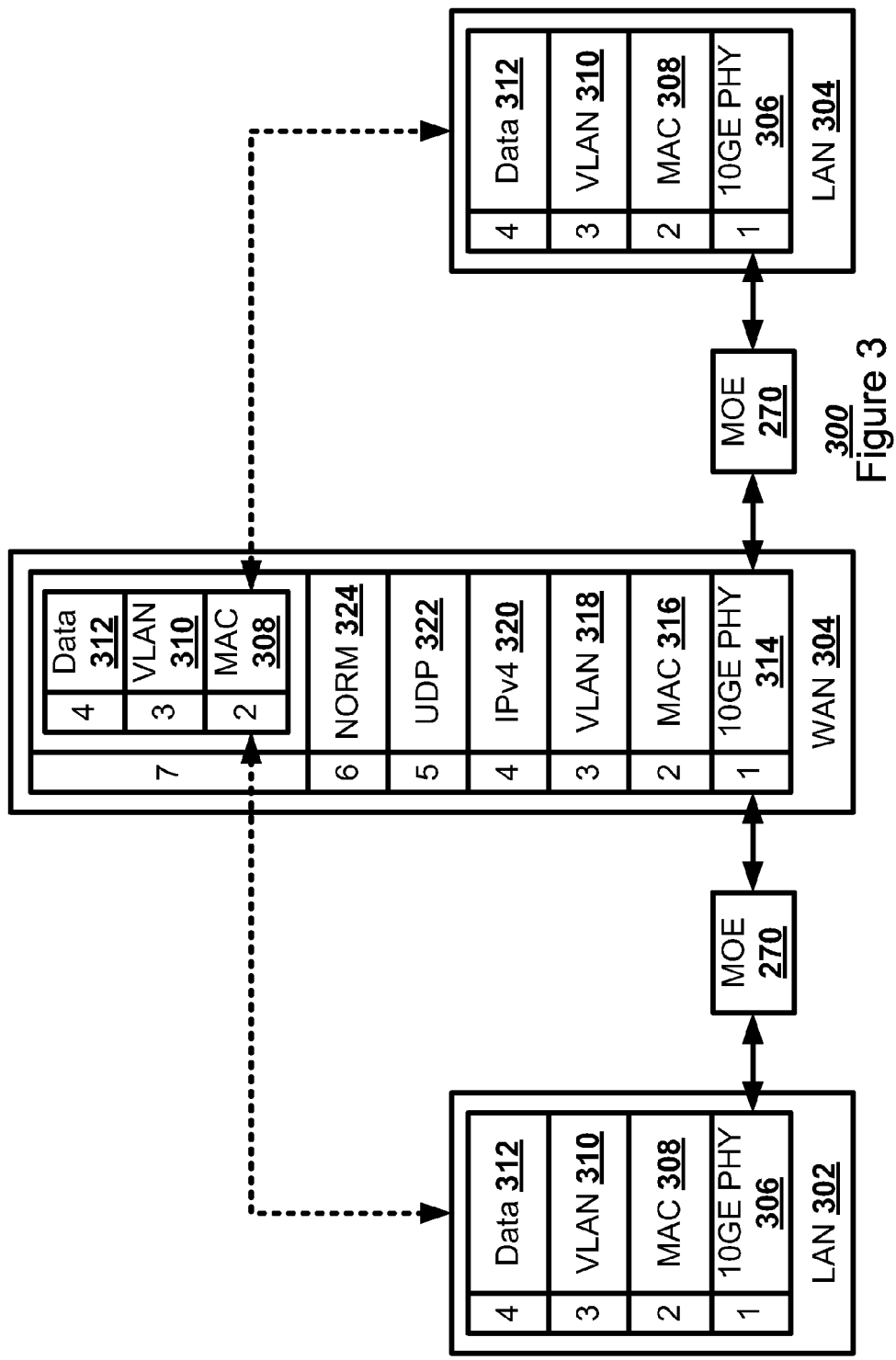
FIG. 3 illustrates, in a block diagram, one embodiment of a transmission control protocol tunnel.

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

The present invention comprises a variety of embodiments, such as a method, an electronic device, and a set of instructions, and other embodiments that relate to the basic concepts of the invention. The electronic device may be any manner of computer, mobile device, wireless communication device, or general purpose electronic device. The set of instructions may reside in a storage medium. The set of instructions may be executable by a processor to implement a method for data transmission.

Many existing applications may use transmission control protocol (TCP) to transmit data from one computerized device to another computerized device. Transmission control protocol may not be as efficient for high speed wideband data transfer over a long-distance non-reliable wide area network (WAN). To improve this, a WAN may use a multiprotocol offload engine (MOE) to tunnel TCP session establishment messages, TCP session teardown messages, and application specific control messages. The wideband data transfers may be terminated and encapsulated inside a negative acknowledgement (NACK) oriented reliable multicast (NORM) data transmission to transmit large amounts of data. The terminated TCP tunnel may support multiple sessions independently. The target MOE may virtually convey the flow control messages via a NORM message. Congestion control messages, such as an acknowledgment for data, may be terminated at the target MOE.

Thus, a method, a multiprotocol offload engine, and a set of instructions are disclosed. A local area network (LAN) interface may receive a TCP data transmission from a source LAN device. A processor may encapsulate the TCP data transmission in a NORM data transmission. A WAN interface may transmit the NORM data transmission over the WAN.

FIG. 1 illustrates a possible configuration of a computing system 100 to act as a server or a client in a local area network. The computing system 100 may include a controller/processor 110, a memory 120, a display 130, a user interface 140, a LAN interface 150, and a WAN interface 160, connected through bus 170. The network server 100 may implement any operating system. Client and server software may be written in any programming language, such as C, C++, Java or Visual Basic, for example. The server software may run on an application framework, such as, for example, a Java® server or .NET® framework The controller/processor 110 may be any programmed processor known to one of skill in the art. However, the disclosed method may also be implemented on a general-purpose or a special purpose computer, a programmed microprocessor or microcontroller, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, any device or devices capable of implementing the disclosed method as described herein may be used to implement the disclosed system functions of this invention.

The memory 120 may include volatile and nonvolatile data storage, including one or more electrical, magnetic or optical memories such as a random access memory (RAM), cache, hard drive, or other memory device. The memory may have a cache to speed access to specific data. The memory 120 may also be connected to a compact disc-read only memory (CD-ROM), digital video disc-read only memory (DVD-ROM), DVD read write input, tape drive, or other removable memory device that allows media content to be directly uploaded into the system. Data may be stored in the memory or in a separate database.

The display 130 may be a device that presents a visual representation or a graphical user interface (GUI) to the user. The user interface 140 may be connected to one or more input devices that may include a keyboard, mouse, pen-operated touch screen or monitor, voice-recognition device, or any other device that accepts input. The user interface 140 may also be connected to one or more output devices, such as a monitor, printer, disk drive, speakers, or any other device provided to output data. The user interface 140 may receive a data task from a network administrator.

A network connection interface may be a LAN connection interface 150 or a WAN connection interface 160. The LAN connection interface 150 and the WAN connection interface 160 may be integrated into a single network connection interface. The WAN connection interface 160 may have a WAN buffer 162 for storing transmissions received over the WAN. The components of the network server 100 may be connected via an electrical bus 170, for example, or linked wirelessly.

Client software and databases may be accessed by the controller/processor 110 from memory 120, and may include, for example, database applications, word processing applications, as well as components that embody the disclosed functionality of the present invention. The network server 100 may implement any operating system. Client and server software may be written in any programming language. Although not required, the invention is described, at least in part, in the general context of computer-executable instructions, such as program modules, being executed by the electronic device, such as a general purpose computer. Generally, program modules include routine programs, objects, components, data structures, etc. that perform particular tasks or implement particular abstract data types. Moreover, those skilled in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like.

FIG. 2a illustrates, in a block diagram, one embodiment of a standard network 200. The standard network may be a LAN 210, a network that connects multiple computers or computer-related devices across a small geographical area. A source LAN device (SRC) 220 may transmit data across the LAN 210 to a destination or target LAN device (DST) 230 using a high speed data protocol.

FIG. 2b illustrates, in a block diagram, one embodiment of an enhanced network 250. The enhanced network 250 may connect two or more LANs 210 over a WAN 260, a network that connects multiple computers or computer-related devices across a broad geographical area, include multiple cities or metropolitan areas. The enhanced network 250 may use a MOE 270 to increase the speed of data transmission across a WAN 260 to the speed across the LAN 210.

FIG. 3 illustrates, in a block diagram, one embodiment of a TCP tunnel 300. A source LAN device 220 may send a LAN data transmission 302 across a WAN 260 to a target LAN device 230 using a MOE 270. The MOE 270 may embed the LAN data transmission 302 in a WAN data transmission 304.

The LAN data transmission 302 may be a TCP data transmission or, more specifically, a file transfer protocol (FTP) data transmission.

The LAN data transmission 302 may be modeled with four layers representing the 10 gigabit Ethernet physical (10GE PHY) layer 306, the media access control (MAC) layer 308, the virtual local area network (VLAN) layer 310, and a data layer 312. The 10GE PHY layer 306 defines the means of transmitting raw bits. The 10GE PHY layer 306 follows the 10 gigabit Ethernet standard provided by the Institute of Electrical and Electronic Engineers (IEEE). The 10 gigabit Ethernet standard may provide a physical layer with a nominal data rate of 10 gigabits per second. The MAC layer 308 is a data link layer 308 defining the means of transfer data between network entities. The MAC layer 308 may provide addressing and channel access control. The VLAN layer 310 defines routing protocol. The VLAN layer 310 may allow a data set to be sent between devices regardless of physical location. The data layer 312 may be the actual data being transferred.

The WAN data transmission 304 may be modeled with seven layers representing the 10GE PHY layer 314, the MAC layer 316, the VLAN layer 318, the internet layer 320, the user datagram protocol (UDP) layer 322, the NORM layer 324, and the data layer. The internet layer 320 describes the protocols to send data between networks. The internet layer 320 may use an internet protocol, version 4 (IPv4) 320, a connectionless protocol for use on a packet switched link layer. The UDP layer 322 is a transport layer providing end to end services. The UDP layer 322 may use a simple transmission model without implicit handshaking dialogues. The NORM layer 324 provides for the bulk transmission of data across a WAN 260. The data layer of the WAN data transmission 304 may include the MAC layer 308, the VLAN layer 310, and the data layer 312 of the LAN data transmission 302.

FIG. 4 illustrates, in a block diagram, one embodiment of a terminated TCP tunnel. A source LAN device 220 may send a LAN data transmission 402 across a WAN 260 to a target LAN device 230 using a MOE 270. The MOE 270 may embed the LAN data transmission 402 in a WAN data transmission 404. The MOE 270 may act as a boundary between TCP transmission and a NORM transmission.

The LAN data transmission 302 may be modeled with six layers representing the 10GE PHY layer 406, the MAC layer 408, the VLAN layer 410, the internet layer 412, the TCP layer 414, and a user data layer 416. The TCP layer allows communication between the user data layer 416 and the internet layer 412.

The WAN data transmission 304 may be modeled with seven layers representing the 10GE PHY layer 418, the MAC layer 420, the VLAN layer 422, the internet layer 424, the UDP layer 426, the NORM layer 428, and the data layer. The data layer of the WAN data transmission 404 may include the MAC layer 408, the VLAN layer 410, the internet layer 412, the TCP layer 414, and the user data layer 416 of the LAN data transmission 302.

FIG. 5a illustrates, in a flow diagram, one embodiment of a standard TCP data transmission session 500 between a client LAN device 502 and a server LAN device 504. The client LAN device 502 may execute a connection establishment exchange 506 with the server 504 to create the standard TCP data transmission session 500. The client LAN device 502 may execute a data transfer 508 with the server 504. The client LAN device 502 may execute a disconnection teardown exchange 510 to end the standard TCP data transmission session 500.

FIG. 5b illustrates, in a flow diagram, one embodiment of a terminated TCP tunnel data transmission session 550 between a client LAN device 502 and a server LAN device 504. The terminated TCP tunnel data transmission session 550 may use a source MOE (MOE-S) 552 and a target MOE (MOE-T) 554 to transmit TCP data transmissions over the WAN. The client LAN device 502 may execute a connection establishment exchange 506 with the server 504 via the source MOE 552 and the target MOE 554 to create the terminated TCP tunnel data transmission session 550. The client LAN device 502 may execute a data transfer 508 via the source MOE 552 and the target MOE 554 with the server 504. The client LAN device 502 may execute a disconnection teardown exchange 510 via the source MOE 552 and the target MOE 554 to end the terminated TCP tunnel data transmission session 550. The server LAN device 504 may send a target acknowledgment (ACK-T) 556 to indicate successful receipt of a data transmission from the client LAN device 502 that is terminated at the target MOE 554. The source MOE 552 may generate a source acknowledgment (ACK-S) 558 to indicate successful receipt of a data transmission from the client LAN device 502 to the client LAN device 502.

Figure 6:
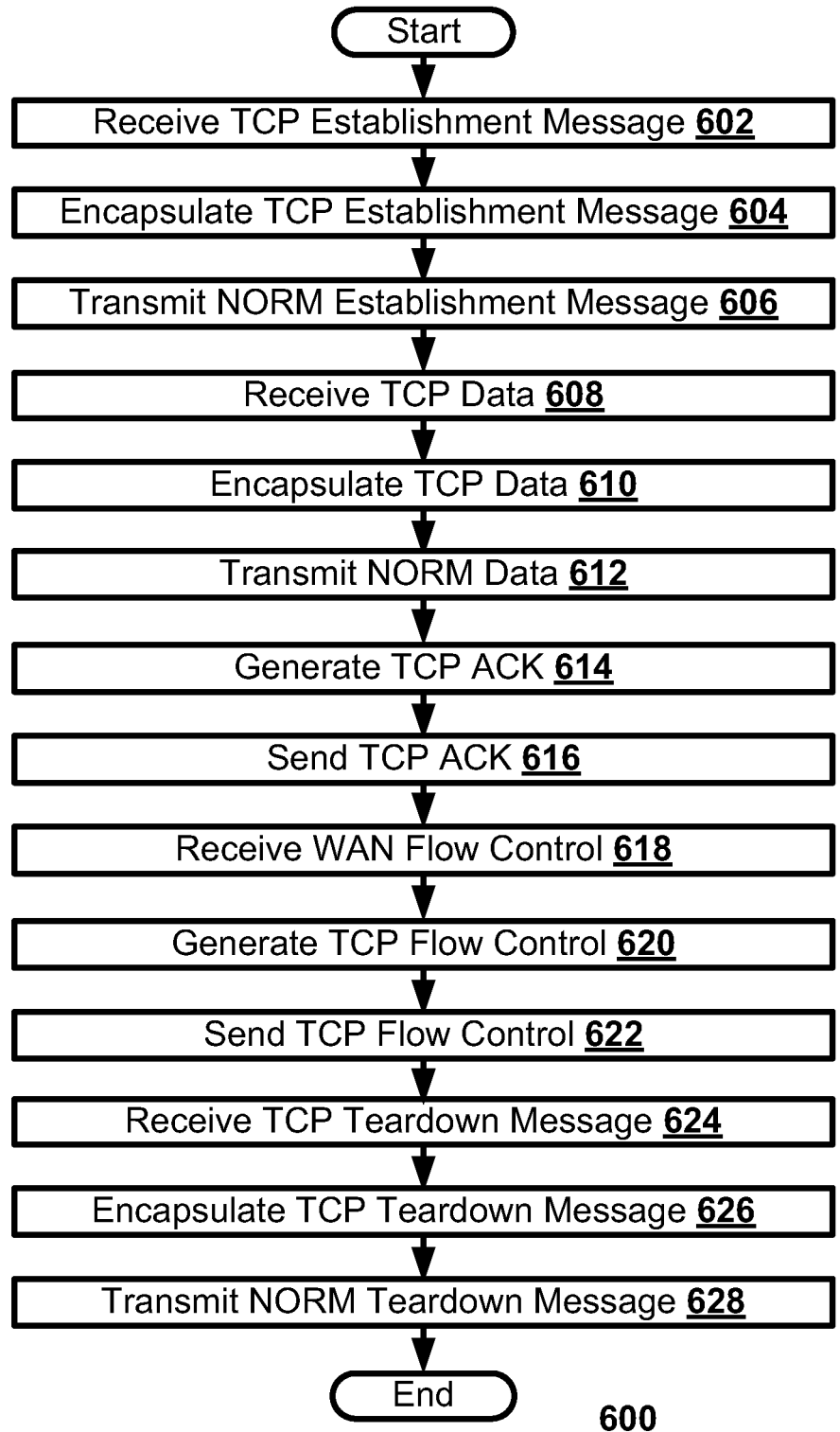
FIG. 6 illustrates, in a flowchart, one embodiment of a method of using a source multiprotocol offload engine.

FIG. 6 illustrates, in a flowchart, one embodiment of a method 600 of using a source MOE 552. The source MOE 552 may receive a TCP session establishment message from a source LAN device (Block 602). The source MOE 552 may encapsulate the TCP session establishment message in a NORM session establishment message (Block 604). The source MOE 552 may transmit the NORM session establishment message over the WAN 260 (Block 606).

The source MOE 552 may receive a TCP data transmission from the source LAN device (Block 608). The source MOE 552 may encapsulate the TCP data transmission in a NORM data transmission (Block 610). The source MOE 552 may transmit the NORM data transmission over the WAN 260 (Block 612). The source MOE 552 may generate a TCP data transmission acknowledgment (Block 614). The source MOE 552 may send the TCP data transmission acknowledgment to the source LAN device (Block 616).

The source MOE 552 may receive a WAN flow control message from a target MOE 554 (Block 618). The source MOE 552 may generate a TCP flow control message (Block 620). The source MOE 552 may send the TCP flow control message to the source LAN device (Block 622).

The source MOE 552 may receive a TCP session teardown message from a source LAN device (Block 624). The source MOE 552 may encapsulate the TCP session teardown message in a NORM session teardown message (Block 626). The source MOE 552 may transmit the NORM session teardown message over the WAN 260 (Block 628).

Figure 7:
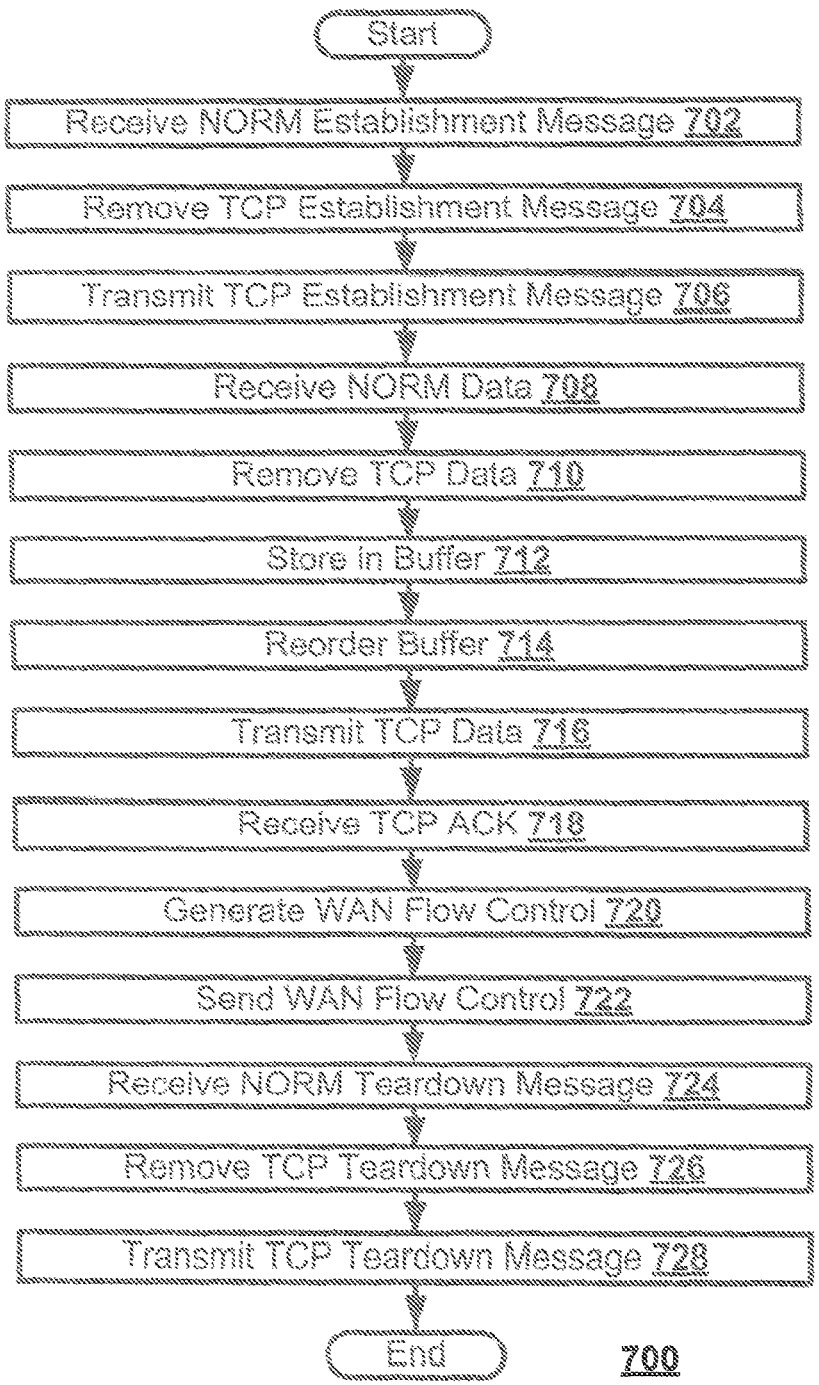
FIG. 7 illustrates, in a flowchart, one embodiment of a method of using a target multiprotocol offload engine.

FIG. 7 illustrates, in a flowchart, one embodiment of a method of using a target multiprotocol offload engine. The target MOE 554 may receive a NORM session establishment message over the WAN 260 (Block 702). The target MOE 554 may remove a TCP session establishment message from encapsulation in the NORM session establishment message (Block 704). The target MOE 554 may transmit the TCP session establishment message to the target LAN device (Block 706).

The target MOE 554 may receive a NORM data transmission over the WAN (Block 708). The target MOE 554 may remove a TCP data transmission from encapsulation in the NORM data transmission (Block 710). The target MOE 554 may store the TCP data transmission in a buffer prior to transmission (Block 712). The target MOE 554 may reorder the TCP data transmission in the buffer (Block 714). The target MOE 554 may transmit the TCP data transmission to a target LAN device (Block 716). The target MOE 554 may receive a TCP data transmission acknowledgment from the target LAN device (Block 718). The target MOE 554 may generate a WAN flow control message (Block 720). The target MOE 554 may send the WAN flow control message to the source MOE 552 (Block 722).

The target MOE 554 may receive a NORM session teardown message over the WAN 260 (Block 724). The target MOE 554 may remove a TCP session teardown message from encapsulation in the NORM session teardown message (Block 726). The target MOE 554 may transmit the TCP session teardown message to the target LAN device (Block 728).

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. Combinations of the above should also be included within the scope of the computer-readable media.

Embodiments may also be practiced in distributed computing environments where tasks are performed by local and remote processing devices that are linked (either by hardwired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments of the invention are part of the scope of this invention. For example, the principles of the invention may be applied to each individual user where each user may individually deploy such a system. This enables each user to utilize the benefits of the invention even if any one of the large number of possible applications do not need the functionality described herein. In other words, there may be multiple instances of the electronic devices each processing the content in various possible ways. It does not necessarily need to be one system used by all end users. Accordingly, the appended claims and their legal equivalents should only define the invention, rather than any specific examples given.

We claim:

1. A method for transferring data, comprising:
 separating, with a multiprotocol offload engine, transmission control protocol control plane messages from a transmission control protocol data transmission, the transmission control protocol data transmission being a file transfer protocol message;

encapsulating the transmission control protocol data transmission inside a negative acknowledgement oriented reliable multicast data transmission for transmission over a wide area network with the multiprotocol offload engine;

transmitting the encapsulated transmission control protocol data transmission in the negative acknowledgement oriented reliable multicast data transmission over the wide area network; and transmitting the transmission control protocol control plane messages to a target device over a terminated transmission control protocol tunnel separately from the encapsulated transmission control protocol data transmission.

2. The method of claim 1, further comprising:
receiving a transmission control protocol data transmission acknowledgement, the transmission control protocol data transmission acknowledgement being terminated at the multiprotocol offload engine.

3. The method of claim 1,
at least one of the transmission control protocol control plane messages being a transmission control protocol session establishment message that is:
separated and not encapsulated in the negative acknowledgement oriented reliable multicast data transmission; and
transmitted separately over the terminated transmission control protocol tunnel to a target local area network device.

4. The method of claim 1,
at least one of the transmission control protocol control plane messages being a transmission control protocol session teardown message that is:
separated and not encapsulated in the negative acknowledgement oriented reliable multicast data transmission; and
transmitted separately over the terminated transmission control protocol tunnel to a target local area network device.

5. The method of claim 1, further comprising:
generating a wide area network flow control message; and
sending the wide area network flow control message to a source multiprotocol offload engine.

6. The method of claim 1, further comprising:
storing, with a multiprotocol offload engine, the transmission control protocol data transmission separated from the transmission control protocol control plane messages in a wide area network buffer prior to transmission; and
reordering the transmission control protocol data transmission in the wide area network buffer.

7. A source multiprotocol offload engine, comprising:
a local area network interface that receives a transmission control protocol data transmission from a source local area network device, the transmission control protocol data transmission is a file transfer protocol message;
a processor that:
separates transmission control protocol control plane messages from the transmission control protocol data transmission, and
encapsulates the transmission control protocol data transmission in a negative acknowledgement oriented reliable multicast data transmission;
a wide area network interface that transmits the negative acknowledgement oriented reliable multicast data transmission over a wide area network; and
a terminated transmission control protocol tunnel interface that separately transmits the transmission control protocol control plane messages from the encapsulated transmission control protocol data transmission.

8. The source multiprotocol offload engine of claim 7, at least one of the transmission control protocol control plane messages being a transmission control protocol session establishment message, the processor (1) separating and not encapsulating the transmission control protocol session establishment message in the negative acknowledgement oriented reliable multicast data transmission, and (2) transmitting the transmission control protocol session establishment message over the terminated transmission control protocol tunnel to a target local area network device.

9. The source multiprotocol offload engine of claim 7, at least one of the transmission control protocol control plane messages being a transmission control protocol session teardown message, the processor (1) separating and not encapsulating the transmission control protocol session teardown message in the negative acknowledgement oriented reliable multicast data transmission, and (2) transmitting the transmission control protocol session establishment message over the terminated transmission control protocol tunnel to a target local area network device.

10. The source multiprotocol offload engine of claim 7, wherein the wide area network interface receives a wide area network flow control message from a target multiprotocol offload engine, the processor generates a transmission control protocol flow control message, and the local area network interface sends the transmission control protocol flow control message to the source local area network device.

11. A non-transitory machine-readable medium having a set of instructions detailing a method stored thereon that, when executed by one or more processors, cause the one or more processors to perform the method, comprising:
receiving a transmission control protocol data transmission from a source local area network device in a source multiprotocol offload engine;
separating, with the source multiprotocol offload engine, transmission control protocol control plane messages from the transmission control protocol data transmission, the transmission control protocol data transmission being a file transfer protocol message;
encapsulating the transmission control protocol data transmission with the transmission control protocol control plane messages separated from the transmission control protocol data transmission in a negative acknowledgement oriented reliable multicast data transmission;
transmitting the negative acknowledgement oriented reliable multicast data transmission over a wide area network; and
transmitting the transmission control protocol control plane messages to a target device over a terminated transmission control protocol tunnel separately from the encapsulated transmission control protocol data transmission.

12. The non-transitory machine-readable medium of claim 11, further comprising:
at least one of the transmission control protocol control plane messages being a transmission control protocol session establishment message that is:
separated and not encapsulated in the negative acknowledgement oriented reliable multicast data transmission; and transmitted separately over the negative acknowledgement oriented reliable multicast data transmission over the wide area network.

13. The non-transitory machine-readable medium of claim 11, further comprising:
   at least one of the transmission control protocol control plane messages being a transmission control protocol session teardown message that is:
   separated and not encapsulated in the negative acknowledgement oriented reliable multicast data transmission; and
   transmitted separately over the negative acknowledgement oriented reliable multicast data transmission over the wide area network.

14. The non-transitory machine-readable medium of claim 11, further comprising:
   receiving a wide area network flow control message from a target multiprotocol offload engine;
   generating a transmission control protocol flow control message; and
   sending the transmission control protocol flow control message to the source local area network device.

\* \* \* \* \*